United States Patent [19]

Siep et al.

[11] Patent Number: 5,740,363
[45] Date of Patent: Apr. 14, 1998

[54] METHOD AND APPARATUS FOR LOW POWER COMMUNICATIONS BETWEEN MOBILE COMPUTING DEVICES

[75] Inventors: Thomas M. Siep; Carl M Panasik, both of Garland; Ronald E. Stafford, Wylie, all of Tex.

[73] Assignee: Texas Instruments Incorporated, Dallas, Tex.

[21] Appl. No.: 753,563

[22] Filed: Nov. 26, 1996

[51] Int. Cl.⁶ ..................................................... G06F 13/00
[52] U.S. Cl. ..................................................... 395/200.3
[58] Field of Search ........................ 395/200.3; 359/152, 359/154, 189

[56] References Cited

U.S. PATENT DOCUMENTS 5,075,792  12/1991  Brown et al. ............................. 359/152
5,495,358   2/1996  Bartig et al. ............................. 359/189

Primary Examiner—William M. Treat
Attorney, Agent, or Firm—Ronald O. Neerings; James C. Kesterson; Richard Donaldson

[57] ABSTRACT

A network (10) of mobile computing devices (18) communicates by receiving and rebroadcasting messages using wireless transmission. A message is initiated by first mobile computing device and transmitted to a set of other mobile computing devices which may be selected on an ad hoc basis. The receiving mobile computing devices rebroadcast the message to other of the mobile computing devices (18) which have not received the message. The message is repeatedly rebroadcast until all mobile computing devices (18) have received the message or, if the message is intended for particular selected mobile computing devices (18), until all selected devices have received the message.

20 Claims, 3 Drawing Sheets

METHOD AND APPARATUS FOR LOW POWER COMMUNICATIONS BETWEEN MOBILE COMPUTING DEVICES

CROSS REFERENCE TO RELATED APPLICATIONS

This application is related to U.S. application Ser. No. 08/706,123, entitled "Active Wireless Network for Calculators" to Siep et al, filed Aug. 30, 1996, U.S. application Ser. No. 08/707,165, entitled "entitled "Passive Wireless Network for Calculators" to Siep et al, filed Aug. 30, 1996, and U.S. application Ser. No. 08/697,808, entitled "Method of Implementing a Network In a Classroom Setting" to Siep et al, filed Aug. 30, 1996, all of which are incorporated by reference herein.

BACKGROUND OF THE INVENTION

1. Technical Field

This invention relates in general to communications and, more particularly, to a method and apparatus for low power communications between mobile computing devices.

2. Description of the Related Art

Electronic calculators have evolved significantly since their inception as a general consumer product in the early 1970's. In addition to arithmetic calculations, current day calculators often provide programming and graphing functions. Graphing calculators include a screen able to display graphics in addition to alphanumeric characters.

For some time, graphing calculators have been able to communicate to one another through a wired connection. An example of a calculator of this type is the TI-92 calculator produced by Texas Instruments Incorporated of Dallas, Tex. Wired connections may be used, for example, in a classroom setting where problem sets are downloaded from the teacher's calculator to the students' calculators. Once downloaded, the students can use the calculator to solve the problem. Other settings, such as business meetings, can benefit from networked calculators.

Despite the advantages of such as system, communication between calculators has not been accepted in widespread use. One reason is that the wires between calculators are somewhat cumbersome to distribute to the students. While the wires could be built into a classroom's infrastructure, the cost of providing the wiring to each desk would be significant. Further, permanent wiring would inhibit flexible arrangement of the student's desks.

Wireless communication between calculators resolves some of the problems of wired connections. Calculators of this type are described in connection with U.S. application Ser. No. 08/706,123, entitled "Active Wireless Network for Calculators" to Siep et al, filed Aug. 30, 1996, U.S. application Ser. No. 08/707,165, entitled "entitled "Passive Wireless Network for Calculators" to Siep et al, filed Aug. 30, 1996, and U.S. application Ser. No. 08/697,808, entitled "Method of Implementing a Network In a Classroom Setting" to Siep et al, filed Aug. 30, 1996, all of which are incorporated by reference herein. The amount of power consumed by these calculators is dependent upon the area over which the communication will occur. Thus, a calculator designed to communicate using wireless transmission in a large classroom would consume more power than a calculator designed to communicate in a small classroom. It is beneficial that a single calculator design work in a variety of classroom sizes and shapes. It is further beneficial that the calculator consumes power at a rate which does not result in excessive battery changes or recharges.

Therefore, a need has arisen for a method and apparatus for communicating between calculators or other mobile computing devices at low power with the ability to cover large room sizes.

SUMMARY OF THE INVENTION

The present invention communicates a data packet to a plurality of mobile computing devices within a defined setting by broadcasting a data packet using wireless transmission from a first mobile computing device at a power sufficient to reach some but not all of the other mobile computing devices. By repeatedly receiving said data packet in a set of said other mobile computing devices and rebroadcasting said data packet to reach mobile computing devices which have not received the data packet, the message is passed on until all of said plurality of mobile computing devices have received the message packet.

The present invention provides significant advantages over the prior art. First, the lifetime of the power source of the mobile computing devices is greatly expanded, since the transmission capabilities are limited to those necessary to reach the nearest other devices, rather than designing the device to reach the furthest possible device. Second, a single device can be used in both small and large areas, since the effective range, i.e., the area over which a message can be sent, is not limited by the broadcast range of a single mobile computing device. Third, the power for transmitting is spread out among all mobile computing devices 18 and, therefore, a single device (such as a teacher's calculator) will not need excessive recharging because it handles the majority of transmissions. Fourth, the transmission is not dependent on predetermined seating patterns, thereby allowing users to move around in the room without becoming detached from the network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

Figure 1:
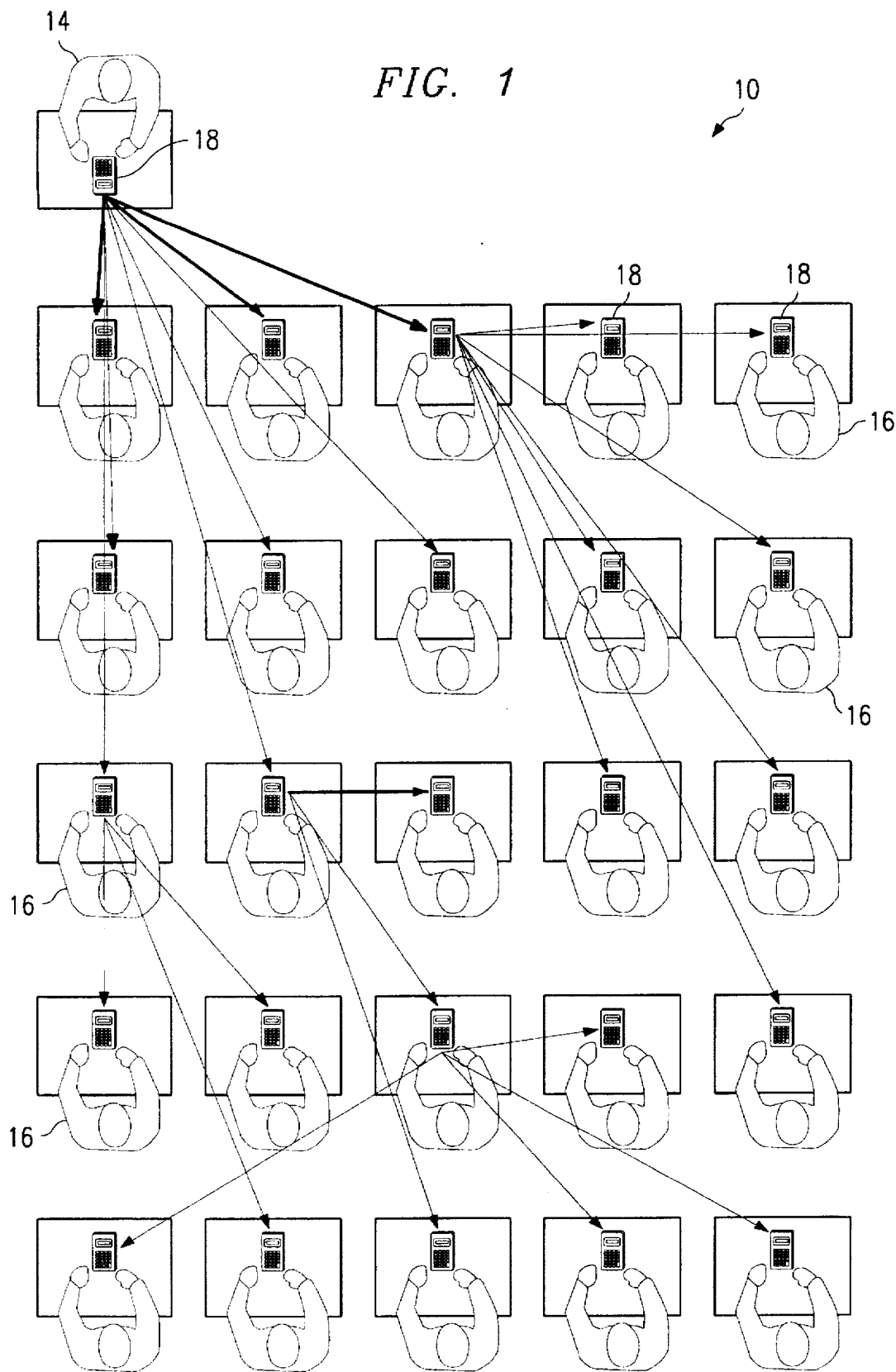
FIG. 1 is a depiction of a network in a classroom setting showing propagation of a message between mobile computing devices.
Figure 2:
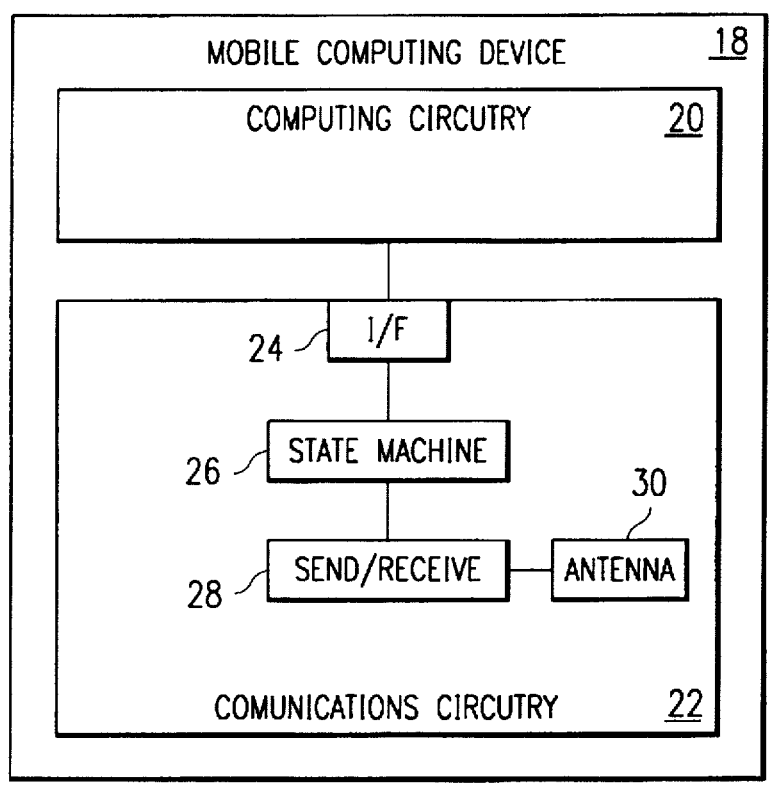
FIG. 2 is a block diagram of a mobile computing device incorporating wireless transmissions.
Figure 3:
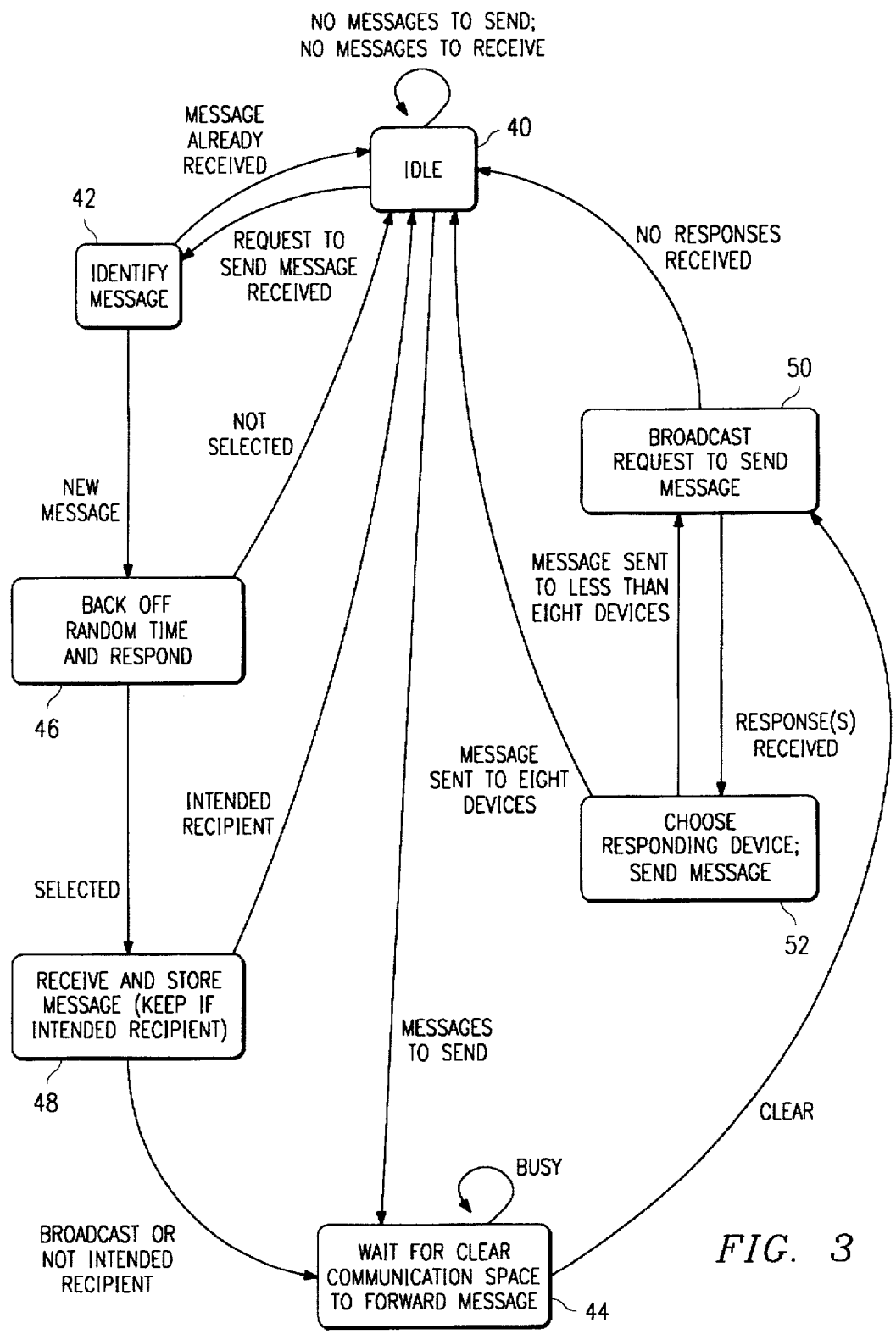
FIG. 3 is a state diagram showing a preferred embodiment of the operation of wireless communication operations of the mobile computing device of FIG. 2.

The present invention is best understood in relation to FIGS. 1–3 of the drawings, like numerals being used for like elements of the various drawings.

FIG. 1 illustrates a wireless network 10 of mobile computing devices in a classroom setting, although any setting may be used. The classroom setting includes a teacher 14 and a plurality of students 16. The teacher 14 and each student 16 have associated mobile computing devices 18 which are capable of receiving and transmitting data by wireless transmission. Individual student calculators 18 are identified in row-column nomenclature as Src, where "r" identifies the students row and "c" identifies the students column. For purposes of illustration, it is assumed that the mobile computing devices are graphing calculators, although other mobile computing devices, such as laptop computers or pocket computers could be used as well.

To initiate sending a message, the sending mobile computing device 18 broadcasts data (hereinafter, the "message") using low-power wireless transmission. In a small setting, such a transmission may be able to reach all of the other mobile computing devices 18; however, it is assumed that in a normal setting, the mobile computing devices 18 have enough transmission power to reach only mobile computing devices which are nearby, without reaching all of the other mobile computing devices 18 in the network 10. By limiting the range of the mobile computing devices 18, a significant amount of power saving can be achieved, which increases the lifetime of the device's batteries.

Once the data is broadcast from the sending mobile computing device, some of the mobile computing devices will receive the message. The mobile computing devices which receive the message will then resend the message at low power. Accordingly, mobile computing devices 18 which did not receive the initial transmission of the message will receive the rebroadcast message from the mobile computing devices 18 which did receive the original message. The mobile computing devices which receive the rebroadcast message will themselves rebroadcast the message. This pattern of receiving and rebroadcasting the message continues until all of the mobile computing devices 18 have received the message. A more detailed implementation for receiving and retransmitting messages is described in connection with FIG. 3.

FIG. 1 uses pointers to further illustrate the transmission of a message to all mobile computing devices 18. In FIG. 1, the message is initiated by the mobile computing device 18 belonging to teacher 14. Because the message is broadcast at low power, the message is received only by the mobile computing devices associated with students S11, S12, S13, S21, S22, S23, S31, and S32. When the teacher's mobile computing device has finished broadcasting, each of the student mobile computing devices may begin to broadcast. A mobile computing device 18 will broadcast only if it does not detect another current transmission (although two mobile computing devices may broadcast simultaneously if they are out of each other's broadcasting range).

When the opportunity arises, each of the mobile computing devices which received the initial broadcast will begin to retransmit the message. Assuming that the mobile computing device 18 associated with student S13 is the first to rebroadcast the message, the message may be received by the mobile computing devices associated with students S14, S15, S24, S25, S34, S35 and S45. The mobile computing devices S12, S22 and S23 would also be in the broadcast area of mobile computing device, but would identify the transmission of mobile computing device S13 as a transmission of a message already received, and would thus not re-receive the message.

Perhaps simultaneously with the transmission of S13, mobile computing device S31 rebroadcasts the message to nearby mobile computing devices 18. As shown in FIG. 1, mobile computing device S31 rebroadcasts the message to mobile computing devices S41, S42 and S52. Since mobile computing device S32 has received the message in the initial broadcast, it does not re-receive the transmission from mobile computing device S31. Mobile computing device S33, for example, may be in the communication space of both mobile computing devices S31 and S13, and therefore will not accept transmissions from either S13 or S31 until it can receive a clear transmission from a single device.

To complete the transmission of the message to all of the mobile computing devices 18, mobile computing device S32 rebroadcasts the message to mobile computing devices S33, S43 and S53. Mobile computing device S43 then rebroadcasts the message received from mobile computing device S32 to mobile computing devices S51, S54 and S55. At this point, all mobile computing devices 18 have received the message. While mobile computing devices S51, S54 and S55 will attempt to rebroadcast the message, none of the other mobile computing devices 18 will respond.

As can be seen from the example of FIG. 1, the size of the classroom can be virtually unlimited so long as each mobile computing device 18 in the classroom is within the broadcast range of at least one other mobile computing device.

The example of FIG. 1 presumes that the message is to be sent to all mobile computing devices 18 in the classroom network. However, the same method can be used to send a message to a selected one or more mobile computing devices 18. In this scenario, the mobile computing devices 18 receive and rebroadcast messages as described above, but only store the messages if they are a selected recipient of the message. Otherwise, if the message is not intended for a particular device, it is deleted by that device after rebroadcasting the message.

FIG. 2 illustrates a block diagram of an exemplary mobile computing device 18, it being understood that the device 18 could have many different designs. Computing circuitry 20 generates messages and control signals for initiating a data transmission. Communications circuitry 22 transmits the data from the computing circuitry 20 using wireless transmission. Communications circuitry 22 includes interface 24, state machine 26, memory 27, send/receive circuitry 28 and antenna 30.

In operation, antenna 30 is used to broadcast and receive data under control of signals from the send/receive circuitry. Send/receive circuitry 28 and antenna 30 could comprise, for example, circuitry for sending information using radio signals, infra-red signals or any other wireless transmission technique. Such circuitry is commonly used in remote control circuits.

State machine 26 controls the operation of the communications circuitry 20. State machine 26 can comprise, for example, a simple programmable processor such as a PIC16C5X or similar device. Memory subsystem 27 is used to store data and instructions and can be internal to state machine 26. Memory 27 may comprise a non-volatile memory, such as a EPROM (erasable programmable read-only memory) or a EEPROM (electrically erasable programmable read-only memory), and a high speed dynamic memory such as a DRAM (dynamic random access memory).

Communications circuitry 20 can be part of an integrated mobile computing device or can be an add-on module. A particular embodiment of an add-on module is described in connection with U.S. application Ser. No. 08/706,123, entitled "Active Wireless Network for Calculators" to Siep et al, filed Aug. 30, 1996 and U.S. application Ser. No. 08/707,165, entitled "entitled "Passive Wireless Network for Calculators" to Siep et al, filed Aug. 30, 1996, which are incorporated by reference herein.

FIG. 3 illustrates a state diagram describing a preferred embodiment for operation of the state machine 26 with regard to the communication of data as described hereinabove. The state machine 26 can also perform other functions in addition to the functions described in FIG. 3, such as controlling the circumstances in which a mobile computing device 18 may initiate an original message, as described in U.S. application Ser. No. 08/697,808, entitled "Method of Implementing a Network In a Classroom Setting" to Siep et al, filed Aug. 30, 1996, which is incorporated by reference herein.

The state machine 26 stays in Idle state 40 while there are no messages to be sent and no messages to receive. From state 40, the state can change to state 42 if another mobile computing device (within transmission range) generates a request to send a message or to state 44 if the associated computing circuitry 20 initiates an original message.

In state 42, the state machine 26 receives information from the send/receive circuitry 28 identifying the message. Each message has a particular identifier which may be stored by the state machine 26 in memory 27. When a request to send is received, the message identifier is compared to previously received identifiers to determine whether the message is new or if the message has previously been received and is being rebroadcast by another mobile computing device 26. If the message has already been received, the state reverts to idle state 40. If the message is new, the state progresses to state 46.

In state 46, the receiving device waits a random amount of time, in order to reduce collisions in responding to the request to send. After expiration of this time, the mobile computing device transmits a response indicating that it is ready to receive the message from the mobile computing device 26 which generated the request to send. The first mobile computing device to transmit a response is selecting by the mobile computing device 26 which made the request to send. The selection of a particular mobile computing device 26 would be made after an appropriate time when all mobile computing devices had been given the chance to respond in state 44. Thereafter, the message is sent to the selected mobile computing device.

Whereas the illustrated embodiment uses the random back-off method of selecting a mobile computing device to receive a message, other methods of prioritizing between the student calculators could also be used.

If not selected in state 44, the state reverts to Idle state 40. If selected, the state transitions to state 46. In state 46, the message is received by the send/receive circuitry 28 and stored in memory 30. If the mobile computing device is an intended recipient of the message, the message will be transferred to the computing circuitry 22 in state 46.

If the mobile computing device is the sole intended recipient in state 46, the state reverts to idle state 40 after receiving the message, since there is no advantage in rebroadcasting the message. If the message was directed to multiple recipients, or if it was directed to a single recipient other than the mobile computing device selected in state 46, the state transitions to state 44. As described above, state 44 is also reached if an original message is received from the associated computing circuitry 22 for transmission.

In state 44, the mobile computing device 26 waits for an opportunity to broadcast by detecting any broadcasts from other mobile devices within its broadcast range. Once it determines that there are no other broadcasts, it will transition to state 50.

In state 50, the state machine 28 initiates a request to send a message. As described above, other mobile computing devices in its broadcast range will respond after waiting a random amount of time. If no responses are received from the other mobile computing devices within a predetermined timeout period, the state reverts to idle state 40, since the lack of responses means that all devices within the mobile computing device's broadcast area have already received the message or, if the message is an original message, that there are no other mobile computing devices within its broadcast area.

If one or more responses are received in state 50, the state progresses to state 52 where a recipient is selected for transmission and the message is sent to that device. The communication of the message may involve protocols and error detection/correction techniques to insure that the message is properly received by the selected mobile computing device 26.

In the preferred embodiment, a mobile computing device will send a message to no more than a predetermined number (in FIG. 3, the predetermined number is eight) of other mobile computing devices. Thus, in state 52, if the mobile computing device 18 has sent the message to less than the predetermined number, it will return to state 50 where another request to send is broadcast. The loop between states 50 and 52 continues until (1) there are no responses to the request or (2) the predetermined number of recipients is reached.

Limiting transmission of a message to no more than a predetermined number allows the receiving mobile computing devices to begin to rebroadcast the message sooner, in at least some instances, which increases the speed of fan out of the message. While up to eight recipients are used in FIG. 3, the actual number could vary or could be set to allow an unlimited number of recipients. Further, the number could be set by the users, depending on the layout of the classroom.

Once the maximum number of recipients is reached, if a maximum number is set, the state reverts to idle state 40.

The state diagram of FIG. 3 illustrates the operation of the communication circuitry for a single mobile computing device 26. In operation, multiple mobile computing devices will be simultaneously performing the operations described in FIG. 3. The transmission of a message can be very fast, while each mobile computing device uses very low power for data transmission.

The present invention provides significant advantages over the prior art. First, the lifetime of the power source of the mobile computing devices is greatly expanded, since the transmission capabilities are limited to those necessary to reach the nearest other devices, rather than designing the device to reach the furthest possible device. Second, a single device can be used in both small and large areas, since the effective range, i.e., the area over which a message can be sent, is not limited by the broadcast range of a single mobile computing device. Third, the power for transmitting is spread out among all mobile computing devices 18 and, therefore, a single device (such as a teacher's calculator) will not need excessive recharging because it handles the majority of transmissions. Fourth, the transmission is not dependent on predetermined seating patterns, thereby allowing users to move around in the room without becoming detached from the network.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of communicating a data packet to a plurality of mobile computing devices within a defined setting, comprising the steps of:

broadcasting a data packet using wireless transmission from a first mobile computing device at a power sufficient to reach some but not all of the other mobile computing devices;

repeating the steps of:
  receiving said data packet in a set of said other mobile computing devices; and
  rebroadcasting said data packet from said set of other mobile computing devices to reach mobile computing devices which have not received the data packet until all of said plurality of mobile computing devices have received the message packet.

2. The method of claim 1 wherein said step of receiving said data packet included the steps of:
  identifying the data packet; and
  determining whether said data packet has been previously received.

3. The method of claim 2 wherein said step of receiving said data packet further includes the step of responding to said first mobile computing device if the data packet has not previously been received.

4. The method of claim 1 wherein said step of transmitting said data packet includes the step of identifying intended recipients for said data packet.

5. The method of claim 4 wherein each mobile computing device which is an intended recipient stores the data packet upon receipt.

6. The method of claim 1 wherein said broadcasting step includes the steps of:
  broadcasting a request to sent the data packet;
  receiving responses to said request from mobile computing devices which have not received the data packet, if any; and
  communicating with one or more of the mobile computing devices from which a response is received.

7. The method of claim 6, wherein said communicating step comprises the step of communicating with one or more of the mobile computing devices from which a response is received, up to a predetermined number of mobile computing devices.

8. A mobile computing device, comprising:
  computing circuitry; and
  communications circuitry for:
    receiving a data packet broadcast from another mobile computing device; and
    rebroadcasting said data packet to nearby mobile computing devices which have not received the data packet.

9. The mobile computing device of claim 8 wherein said communication circuitry identifies data packets from other mobile computing devices and determines whether the data packets have been previously received.

10. The mobile computing device of claim 9 wherein said communications circuitry further generates a response message responsive to identifying a data packet which has not been received.

11. The mobile computing device of claim 9 wherein said communication circuitry is operable to broadcast data packets responsive to said computing circuitry.

12. The mobile computing device of claim 11 wherein said communication circuitry provides an identifier for each broadcast data packet.

13. The mobile computing device of claim 8 wherein said communication circuitry further indicates which mobile computing devices are intended recipients for a broadcast data packet.

14. The mobile computing device of claim 13 wherein said communication circuitry stores messages for which the associated mobile computing device is an intended recipient.

15. A calculator comprising:
  computing circuitry; and
  communications circuitry for:
    receiving a data packet through wireless transmissions from another mobile computing device; and
    retransmitting said data packet using wireless transmission at low power to nearby mobile computing devices which have not received the data packet.

16. The calculator of claim 15 wherein said communication circuitry identifies data packets from other mobile computing devices and determines whether the data packets have been previously received.

17. The calculator of claim 16 wherein said communications circuitry further generates a response message responsive to identifying a data packet which has not been received.

18. The calculator of claim 16 wherein said communication circuitry is operable to transmit data packets responsive to said computing circuitry.

19. The calculator of claim 18 wherein said communication circuitry provides an identifier for each broadcast data packet.

20. The calculator of claim 15 wherein said communication circuitry further indicates which mobile computing devices are intended recipients for a broadcast data packet.

* * * * *